United States Patent [19]
Speth et al.

[11] 3,953,332
[45] Apr. 27, 1976

[54] PURIFICATION OF WASTE WATER CONTAINING ORGANIC AND INORGANIC IMPURITIES

[75] Inventors: Sebastian Speth, Oberhausen; Georg Küppenbender, Willich; Willi Jansen, Oberhausen, all of Germany

[73] Assignee: Ruhrchemie Aktiengesellschaft, Oberhausen, Germany

[22] Filed: June 27, 1974

[21] Appl. No.: 483,739

[30] Foreign Application Priority Data
July 3, 1973  Germany............................ 2333668

[52] U.S. Cl................................. 210/71; 210/521
[51] Int. Cl.² ........................................ B01D 35/18
[58] Field of Search ................. 210/42, 57, 66 (71), 210/83, 187, 521, 335

[56] References Cited
UNITED STATES PATENTS

| | | | |
|---|---|---|---|
| 562,376 | 6/1896 | Chamberlain......................... | 210/66 |
| 1,458,805 | 6/1923 | Christensen .......................... | 210/83 |
| 3,205,588 | 9/1965 | Octjen et al. ......................... | 210/66 |
| 3,407,937 | 10/1968 | Bakker et al. ................... | 210/335 X |
| 3,567,675 | 3/1971 | Merck et al. .......................... | 210/66 |
| 3,640,387 | 2/1972 | Conley et al........................... | 210/83 |
| 3,707,464 | 12/1972 | Burns et al............................. | 210/66 |
| 3,782,557 | 1/1974 | Pielkenrord ........................ | 210/521 |

*Primary Examiner*—Theodore A. Granger
*Attorney, Agent, or Firm*—Burgess, Dinklage & Sprung

[57] ABSTRACT

An improvement in a process for separating waste water from a water insoluble organic liquid which is lighter than water and a water insoluble solid which is heavier than water wherein said waste water, organic liquid and solids are introduced into an introduction zone of a gravity separator, thereafter passed through a separation zone of said separator and a water phase is removed from said separator, which improvement comprises a higher purity of waste water by avoiding diminuation of the temperature of the components in said separation zone below the temperature of the waste water at the entrance of the separator by adjusting the temperature in the introduction zone to prevent flocculation of solids in said separation zone.

7 Claims, 1 Drawing Figure

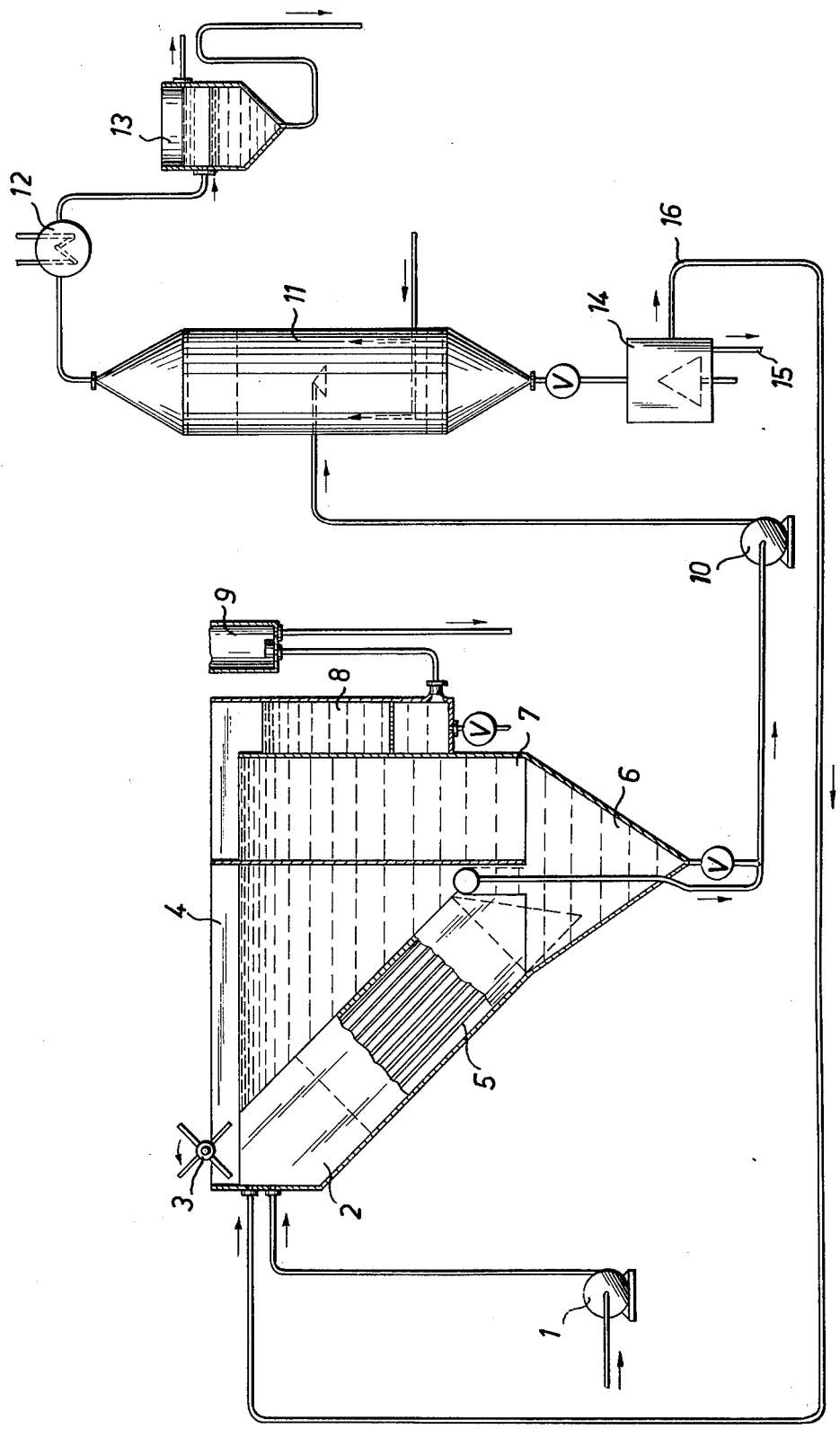

PURIFICATION OF WASTE WATER CONTAINING ORGANIC AND INORGANIC IMPURITIES

BACKGROUND OF THE INVENTION

1. Field of the Invention

This invention relates to the purification of waste waters, particularly industrial waste waters. This invention is particularly directed to the purification of waste waters used in the Oxo-process whereby the waters are purified to such an extent that they can be discharged into waterways without adversely affecting the biological life therein. More especially, this invention relates to the purification of waste water and the separation of the same from light water insoluble organic liquids and water insoluble solids which flocculate in the presence of such water insoluble liquids.

2. DISCUSSION OF THE PRIOR ART

Specifically lighter organic compounds have generally been separated from waste waters originating from industrial plants by means of known gravity separators. Recently, it has been found that newly available tilted plate separators designed in the form of a U-tube are especially well suited. These tilted plate separators are provided with an inlet for the waste water to be treated at one side and an overflow for the purified waste water on the other. A suitable tilted plate separator is shown in an article in *Oil and Gas Journal*, Dec. 14, 1970, the disclosure of which is hereby incorporated herein by a reference.

Water passing from one leg of the U-tube to the other is caused to flow through a plate pack which is the purifying section of the separator. In this purification section the plates are mounted parallel to one another in a relative short distance and they are arranged at an angle of about 45° to the horizontal in the direction of the flow of the waste water. The flow of the water between the plates is laminar. The settling distance is reduced to the vertical distance between the plates so that the specifically lighter organic impurities, after a short distance, meet on a wall. When they meet at the wall the droplets are united and, by virtue of the difference between their specific weight and that of water, they rise opposed to the flow direction of the water. They are caused to ride up in the free space above the plate pack. A special embodiment of a rapid gravity separator is provided with corrugated plates, the axes of the wave crests and troughs being arranged in the flow direction of the water.

Industrial waste waters being discarded must meet demands of purity in order to prevent extreme pollution of waterways, resulting in detrimental influence on the biological environment. An economic process for a complete purification with respect to a feasible apparatus in terms of assembly and financial expenditure is, therefore, highly desirable.

The separators heretofore provided have been used in separating and purifying waste waters containing easily separable specifically lighter phases as for instance specifically lighter oils and relatively coarse, quickly settling specifically heavier solids, as for instance sand.

A particular problem is encountered where the purification of the waste water involves the separation of specifically heavier solid substances of large surface area having been precipitated and being able to adsorb said specifically lighter organic liquids. In this case, small amounts of heavy sedimentary sludge, consisting for instance of metal oxides are formed besides larger amounts of voluminous layers of specifically lighter swimming sludge consisting of solid material and organic oil constituents the weight of the resultant swimming sludge being lower than that of water. It rises countercurrent to the direction of flow of the water rides up and is separated at the surface of the introduction zone or bay of the gravity separator, while the sedimentary heavy sludge separates out, descends in the tilted plate pack and settles in a collecting vessel located below the plate pack.

During the residence time of the waste water in the separator required for the separation of the voluminous floating sludge, the waste water is cooled. Owing to said cooling, resulting in a shifting of the saturation degree, a consecutive flocculation occurs in conventional separating devices. From exhaustive tests it has been observed that the solid particles precipitated and flocculated by said consecutive flocculation are extremely voluminous and settle only very slowly. Owing to their large surface area, they are capable of adsorbing the oil droplets of the organic liquid riding up in the ridges of the plates of the plate pack, resulting in the formation of a mixed solid/oil phase whose specific weight is considerably near to that of the water. Thus, the resultant phase is drifted along and discharged with the waste water. There is not formed a separate, definite and definable swimming sludge nor is any sedimented heavy sludge created within the separation zone of the gravity separator. The result is that the waste water removed from the gravity separator contains a high content of organic liquids which is mixed with the solids as sludge in an almost homogeneous phase inseperable from waterphase. Thus, the ability of the gravity separator to separate such components is considerably decreased.

It is, therefore, an object of the present invention to increase the efficiency of commercially available gravity separators for the removal of purified waste waters, especially to increase the purification efficiency of gravity separators of the parallel plate interceptive type, separating waste waters from water insoluble organic liquids of lighter weight than water and solids of large surface area which can flocculate in the presence of such lighter organic liquids, which solids are themselves heavier than water.

SUMMARY OF THE INVENTION

The above objects are provided by an improvement in a process for separating purified waste water from a water insoluble organic liquid which is lighter than water and a water insoluble solid which is heavier than water wherein said waste water, organic liquid and solids are introduced into an introduction zone of a gravity separator, thereafter passed through a separation zone formed for instance in tilted plates of said separator and a water phase is removed from said separator. The improvement whereby the water is substantially free of organic impurities comprises avoiding diminuation of the temperature of the components in said separation zone below the temperature of the waste water at the entrance of the separator by adjusting the temperature in the introduction zone to prevent flocculation of solids in said separation zone, preferably by introduction of hot water into said introduction zone. A distinct swimming sludge having a lower specific weight than water and a sedimented sludge phase having a higher specific weight than water, can be removed and the components thereof can be separated.

The present invention can be better understood when one realizes the individual steps which occur in the use of a gravity separator. Initially, the components to be separated are introduced into an introduction zone of the gravity separator. Thereafter they pass into a separation zone wherein separation of the water from the organic and solid components takes place. In prior art processes it had been experienced that while some flocculation occurred such flocculation actually interfered with the removal of purified waste water for there was additionally formed a flocculate that had the same specific weight as water. The net result was that the flocculate was mixed in a more or less homogeneous phase with the water and left the separator together with the latter.

It has been found, in accordance with the present invention, that simply by adjusting the temperature of the materials in the introduction zone that undesired flocculation in the separation zone can be presented so that there are formed two distinct sludge phases, a sedimented heavy sludge phase which rapidly settles to the bottom of the gravity separator and a lighter, but more distinct swimming sludge phase. This lighter swimming sludge phase is lighter than the water phase and can be removed from the surface of the water in the introduction zone of the separator by a skimming type operation. The water phase can then be removed by passing the same over a weir.

Thus, with the process of the present invention consecutive flocculation which would result in the formation of solid particles of large surface area having high adsorption capacity for the organic impurities during the contact time with the latter, is prevented. This is enabled due to the introduction of sufficient heat to the components in the introduction zone. The solids being precipitated during further cooling of the waste water after passing the tilted plate separation zone, have no organic impurities and are deposited as sedimentary heavy sludge.

The present invention can be carried out by simply raising the temperature of the components entering the introduction zone. However, it is preferable to add to such zone warm water to increase the temperature to such that consecutive flocculation is prevented during the contact time with the specifically lighter organic omponents and that the materials which ultimately precipitate have a weight which is greater than the weight of water. The process is preferably conducted by removing sludge and oil phases from the gravity separator and, thereafter, subjecting them to a steam distillation process. In this process the lighter organic materials are separated overhead and a bottoms product containing water and solids is obtained. The water can be separated by centrifugation from the solids and the same can be returned as warm water to the introduction zone of the gravity separator. By use of such a process there is a constant supply of warm water which will facilitate the separation action in the gravity separator. Moreover, there is also accomplished through the use of the steam distillation, the separation of the solids from the lighter organic liquids.

Naturally, the extent to which flocculation would be effected in the separation zone depends upon the composition of the dissolved solid material, their solubility and concentration in the waste water to be purified. The process can be suitably conducted by adjusting the temperature of the components in the introduction zone such that the temperature is at least 1° and preferably at least 3°C above that temperature at which precipitation would be effected. This insures that the consecutive flocculation in the separation zone is prevented. The temperature in the introduction zone can be adjusted by suitable regulation of the amount of hot water being returned from the steam distillation process. If, for instance, 70 cubic meters per hour of waste water are to be treated and a temperature in the introduction zone of 35°C. is to be maintained, 300 liters per hour of water returned from the steam distillation product of 70° to 80°C. is suitable. The process is capable of a wide variety of different process paramaters. If at particularly high load for the separator, the heat of any recycled water from the steam distillation process is not sufficient to prevent consecutive flocculation of dissolved solid substances, it is advantageous to isolate the single aggregates of the separator, in order to prevent heat losses.

The process of the invention is suitable for the separation of numerous water insoluble liquids. Included within such term are aldehydes, alcohols, glycols, esters, ketones as well as addition and condensation of such carbonyl containing compounds. Water insoluble solid materials which can be separated according to the invention include a wide variety of such solids especially oxides, hydroxides, carbonates and other solids of metals. It will be understood by one of skill in the art that the specific chemical composition of the water insoluble liquids and solids which are separated according to the invention are not critical as the process of the invention operates regardless of the specific chemical properties thereof.

BRIEF DESCRIPTION OF DRAWING

Referring to the drawing herein, the accommpanying drawing is a schematic diagram showing an apparatus suitable for carrying out the invention and the flow of the various components therethrough.

DESCRIPTION OF SPECIFIC EMBODIMENTS

The present invention can be more readily understood and appreciated when reference is made to the accompanying drawing. The process is conducted suitably by pumping waste water into a tilted gravity separator, the water being sucked from a waste water channel by means of a pump 1. Initially, it is delivered to the introduction zone or bay 2 of the gravity separator. At such time there is delivered to such introduction zone warm water from a steam distillation process, such warm water entering said introduction zone at a point above the point wherein the waste water is introduced to said zone. The warm water from the steam distillation process enters the introduction zone through line 16. In the introduction zone 2 there is an initialrough separation of an organic product swimming sludge phase which is continuously removed by the aid of a paddle 3 ober a downward-sloping discharge 4. Heavy sludge is separated from organic product and water in a tilted plate pack 5. Organic product ascends and is continuously drained off over the downward sloping discharge 4. Heavy sludge deposits in a collecting vessel 6 and is intermittently drawn off by means of pump 10. Clarified water ascends in a water compartment 7. It is raised to overflow a weir and to enter into an outlet passage 8, the latter serving as an additional settling tank. By means of a siphon 9, a definite water level is maintained in outlet passage 8.

With the aid of pump 10, organic product, swimming sludge and heavy sludge are introduced into steam distillation column 11. By introduction of steam at 1.6 bar a vapor temperature of 98°C. is maintained at the head of the column with the aid of a Samson type regulator. This temperature is sufficient for the evaporation of organic constituents of the product. The level in the steam distillation column 11 is maintained by discontinuous addition of water and heavy sludge from collecting vessel 6 and controlled by a conventional level regulator. The distillation product is cooled in cooler 12, enters phase separator 13 and is separated into an organic phase, which is drained off for further treatment. The organic phase is separated from water therein.

Water and sludge from steam distillation column 11 are removed as bottoms and introduced into decanter 14. A sludge phase 15, containing solids, is drawn off and separately worked up. A decanted water phase 16 is recycled to the introduction zone of the tilted plate separator to heat up the entering unpurified waste water entering such zone through the line connected to the pump 1.

In order to more fully illustrate the nature of the invention and the manner of practicing the same the following example is presented:

EXAMPLE

Waste water from an Oxo-synthesis process is adjusted by addition of 2.5% aqueous sodium hydroxide solution to a pH value of about 11.5 whereby dissolved metallic impurities are precipitated. This initial precipitation serves to insure that all metallic impurities are in a definite form and are in a controllable and uniform state. Thereafter, they are introduced by means of a conventional slow running immersion pump disposed about 20 cm. below the water surface into a tilted plate separator of the type shown in the accompanying drawing. The entering waste water is uniformly distributed therein by use of a slotted tube. It enters the introduction zone 2 of the separator at a temperature of about 30° to 35°C. At a point above the point at which the entering unpurified waste water is introduced into the introduction zone there is introduced into such introduction zone water of higher temperature in an amount to maintain the temperature of the waste water at 33° – 38°C. When treating 70 cubic meters per hour of waste water there is introduced to the introduction zone 300 liters per hour of water at 70° to 80°C., said water coming from a steam distillation process. The separator employed has 10 elements.

In this separator, water is separated from swimming sludge comprising organic substances flowing upward to the plate packed inlet, and from small amounts of metal oxides descending and being collected as sedimentary sludge below the plate pack. Its content of substances which are soluble in petroleum ether ranges within the limits of the current tentative standard so that it can be introduced into waterways.

Swimming sludge and organic compounds are continuously drawn off by means of a plunger pump having means for controlling the revolutions thereof. The swimming sludge is united with sedimentary sludge withdrawn from the lower end of the separator and united with the swimming sludge. A plunger pump with means for controlling the revolutions thereof can facilitate this operation. The united sludges are introduced into a stripping column at a rate of 500 kgs. per hour.

The stripping column is maintained at a pressure of 1.6 bar by-product steam. The organic constituents which are distilled off in the steam distillation process are condensed in a cooler and are separated from the water. The resulting hot water (300 liters per hour) having a temperature of about 70° to 80°C. is recycled to the separator as hereinbefore mentioned in order to regulate the temperature thereof.

The water containing sludge from the sump of the steam distillation column is introduced into a decanter from which hot filtrate is also used for controlling the temperature in the introduction zone of the separator. The hot water introduced into the separator is also uniformly distributed over the entire area of the receiving bay by means of a slotted tube.

By use of the herein described process of separating components of waste water and purifying such waste water in a tilted-plate separator the content of petroleum ether soluble constituents is below about 35 parts per million. If, however, the process is conducted without the addition of hot water, i.e., without the regulation of the temperature of the components in the introduction zone the resulting waste water contains about 120 parts per million petroleum ether soluble constituents.

What is claimed is:

1. In a process for the separation of the components of a three phase system wherein:
    A. One of the components is water;
    B. Another of the components is a water-insoluble organic liquid of lighter specific weight than said water, which liquid is in the form of a swimming sludge phase and comprises an aldehyde, an alcohol, a glycol, an ester or an addition or condensation product thereof; and
    C. The third component is a solid which tends to flocculate when a heated mass containing the same is cooled, by a process wherein a mixture containing such components A, B and C at elevated temperature is fed into the introduction zone of a tilted gravity separator and from there flows into a separation zone having a plurality of downwardly inclined tilted plates wherein said water-insoluble organic liquid ascends said tilted plates and is removed and said water and said solids are separated from one another, the improvement for decreasing the amount of petroleum ether soluble constituents in said water which comprises maintaining the temperature of the mass in the separation zone sufficient to prevent flocculation of said solids by introducing into said introduction zone additional water of increased temperature and in such quantity that the amount of heat is sufficient to equalize the temperature decrease of the waste water occurring during the residence time in the tilted plate separator, and thereafter precipitating the solids and separating the solids from the water.

2. An improvement according to claim 1 wherein sludge is removed from said separation zone, introduced into a steam distillation process wherein lighter organic components are separated therefrom and water from said steam distillation process is recycled to the introduction zone of said gravity separator.

3. A process according to claim 2 wherein the water being recycled to the introduction zone is at a temperature of 70° to 80°C.

4. A process according to claim 1 wherein said solids are flocculatable solids have a surface area such that they absorb oil.

5. A process according to claim 1 wherein the organic liquids contain a component selected from the group consisting of aldehydes, alcohols, glycols, esters, ketones, addition products of carbonyl compounds and condensation products of carbonyl compounds.

6. A process according to claim 1 wherein said water insoluble solid materials are selected from the group consisting of oxides, hydroxides and salts of metals.

7. A process according to claim 1 wherein the waste water being treated is waste water from an Oxo-synthesis process.

* * * * *